United States Patent

Baruschke et al.

[11] Patent Number: 5,934,987
[45] Date of Patent: Aug. 10, 1999

[54] DEVICE AND METHOD FOR CONTROLLING AIR CONDUCTION ELEMENTS OF A VEHICLE

[75] Inventors: Wilhelm Baruschke, Wangen; Alexander Boehlendorf, Boeblingen; Markus Flik, Stuttgart; Oliver Kaefer, Ingersheim; Hans Kampf, Korb; Karl Lochmahr, Vaihingen; Tilo Rinckleb, Bad Friedrichshall; Dieter Schmadl, Neu-Ulm, all of Germany

[73] Assignee: Behr GmbH & Co., Stuttgart, Germany

[21] Appl. No.: 08/928,431

[22] Filed: Sep. 12, 1997

[30] Foreign Application Priority Data

Sep. 13, 1996 [DE] Germany .............. 196 37 232

[51] Int. Cl.⁶ .................................. F24F 3/14
[52] U.S. Cl. .............. 454/75; 165/223; 236/44 A; 236/49.3; 454/121; 454/139
[58] Field of Search .............. 454/75, 139, 121; 236/44 C, 49.3, 44 A; 165/202, 223; 62/93, 176.2, 176.6

[56] References Cited

U.S. PATENT DOCUMENTS

| 3,970,246 | 7/1976 | Attridge, Jr. et al. ............... 236/44 |
| 4,408,660 | 10/1983 | Sutoh et al. ............... 165/202 |
| 4,437,391 | 3/1984 | Eguchi et al. . | |
| 4,791,905 | 12/1988 | Furuta et al. ............... 123/497 |
| 4,917,293 | 4/1990 | Fedter et al. ............... 236/49.3 |
| 4,932,588 | 6/1990 | Fedter et al. ............... 236/44 R |
| 4,992,965 | 2/1991 | Hölter et al. ............... 364/551.01 |
| 5,259,813 | 11/1993 | Abthoff et al. ............... 454/75 |
| 5,320,577 | 6/1994 | Tooru et al. ............... 454/75 |
| 5,516,041 | 5/1996 | Davis, Jr. et al. ............... 236/49.3 |

FOREIGN PATENT DOCUMENTS

| 0 501 127 | 9/1992 | European Pat. Off. . |
| 36 24 171 | 1/1988 | Germany . |
| 36 10 069 | 10/1989 | Germany . |
| 43 12 046 | 10/1994 | Germany . |
| 43 12 788 | 10/1994 | Germany . |
| 44 27 793 | 2/1996 | Germany . |
| 195 09 495 | 4/1996 | Germany . |
| 44 41 264 | 5/1996 | Germany . |
| 195 40 566 | 6/1996 | Germany . |
| 95/29435 | 11/1995 | WIPO . |

Primary Examiner—Harold Joyce
Attorney, Agent, or Firm—Foley & Lardner

[57] ABSTRACT

A device and method for controlling air conduction in a vehicle includes an air conduction element. The air conduction element is controlled as a function of the moisture in the vehicle interior, intermediate positions of the air conduction element being possible between a maximum proportion of circulating air and a maximum proportion of fresh air. In this way, the proportion of fresh air is increased only gradually when there is a high pollution impact if the interior moisture does not exceed a maximum moisture value $\Phi_{max}$. Control of the moisture in the vehicle interior increases the comfort of the vehicle occupants. A circulating-air dryer makes it possible, in principle, to continue in circulating-air operation for an unlimited period.

20 Claims, 4 Drawing Sheets

DEVICE AND METHOD FOR CONTROLLING AIR CONDUCTION ELEMENTS OF A VEHICLE

BACKGROUND OF THE INVENTION

The invention relates to a device and a method for controlling air conduction in a vehicle.

A device for controlling air conduction in a vehicle is known from DE 195 09 495 Cl. That device switches an air conduction element from fresh-air operation to circulating-air operation (and vice versa) depending on status conditions. The switchover takes place as a function of the outside-air temperature and the operating state of the air conditioning unit. Controlled by a large number of timing elements, circulating-air and fresh-air operation take place alternately, in each case at fixed time intervals depending on the status conditions. Thus, it is known to adjust air conduction elements to set a proportion of circulating air and fresh air as a function of status variables, such as for example the outside-air temperature and the interior vehicle temperature. A disadvantage of this known device is that the switchover from fresh-air operation to circulating-air operation (and vice versa) is not dependent on all the relevant status conditions. For example, a switchover has to take place periodically in fresh-air operation at specific points in time, although a constant pollution impact of the ambient air is detected. Furthermore, switchover of the air conduction element only takes place from one end position to an opposite end position. No intermediate positions are provided.

The difficulties suggested in the preceding are not intended to be exhaustive but rather are among many which tend to reduce the effectiveness of known air conduction systems. Other noteworthy problems may also exist; however, those presented above should be sufficient to demonstrate that such apparatuses and related methods appearing in the past will admit to worthwhile improvement.

SUMMARY OF THE INVENTION

Accordingly, it is therefore a general object of the invention to provide a device and method for controlling air conduction in a vehicle which will obviate or minimize difficulties of the type previously described.

An object of the present invention is to provide a device with controllable air conduction elements of a vehicle so that the highest possible degree of air purity in the vehicle interior is ensured, while avoiding misting of the windows.

An embodiment of the invention which is intended to accomplish at least some of the following objects includes a pollutant-gas sensor adapted to detect the concentration of pollution in outside air and to generate a signal representative of the concentration of pollution in the outside air; an exterior temperature sensor adapted to detect the temperature of the outside air ($T_A$) and to generate a signal representative of the temperature of the outside air; an interior temperature sensor adapted to detect the temperature of an interior of the vehicle ($T_I$) and to generate a signal representative of the temperature of the vehicle interior; a moisture sensor adapted to detect the moisture in an interior of the vehicle and to generate a signal representative of the moisture of the vehicle interior; a control unit electrically communicating with the pollutant-gas sensor, the exterior and interior temperature sensors, and the moisture sensor, and an air conduction element adapted to receive the control signal. The control unit is adapted to produce a control signal that depends on the signals generated by and the pollutant-gas sensor. The control unit also electrically communicates with and is adapted to adjust the air conduction element to operate in at least one of a circulating-air mode and a fresh air mode, dependent on signals from the moisture sensor and the pollutant-gas sensor.

A method for controlling air conduction in a vehicle in accordance with the invention comprises providing an air conduction element positionable to control the circulating air and fresh air to be supplied to an interior of the vehicle; providing a plurality of sensors adapted to generate signals indicative of vehicle status conditions; and positioning the air conduction element in at least one of a circulating-air position, a fresh-air position, and any desired intermediate position between the circulating-air position and the fresh-air position, depending on the signals generated by the sensors.

One advantage of the invention lies, in particular, in the fact that switchover from fresh-air operation to circulating-air operation or vice versa takes place as a function of a moisture signal from a moisture sensor located in the vehicle interior. If a maximum moisture value is detected by the moisture sensor in the vehicle interior, switchover from circulating-air operation to fresh-air operation takes place so as to avoid misting of the windows.

In addition to the moisture sensor, a circulating-air dryer may be provided, so that the maximum permissible moisture value occurs only after a prolonged period of circulating-air operation and thus circulating-air operation can continue for a longer time without misting of the windows occurring. The use of a circulating-air dryer is particularly advantageous when driving through relatively long tunnels or in general when there is a high pollution impact of the outside air, for example when traffic is backed up or traffic stops and starts.

When using a continuously operating circulating-air dryer whose drying elements are continuously desorbable and whose absorption capacity is sufficiently large, it is possible to continue circulating-air operation without any time limit without the windows becoming misted.

According to a further development of the invention, the air conduction element can be held in an intermediate position, so that, on the one hand, fresh air and, on the other hand, circulating air can flow into the vehicle interior. This provides far-reaching adaptation to the requirements of comfort of the vehicle occupants, a compromise being made between the air quality and the moisture in the vehicle interior. During prolonged high pollution impact, the air conduction element is advantageously moved from a circulating-air position to an intermediate position in which the air stream supplied to the vehicle interior is composed of a small proportion of fresh air and a large proportion of circulating air. This adjustment of the air conduction element takes place as soon as the moisture signal produced by the moisture sensor has risen to the extent that misting of the windows is expected. Consequently, in the case of a prolonged high concentration of pollution in the ambient air, on the one hand, misting of the windows is avoided and, on the other hand, the pollution impact is reduced to a minimum for the vehicle occupants.

According to a further development of the invention, the moisture of the vehicle interior in a pollutant-free area is controlled to a desired moisture value which promotes the comfort of the vehicle occupants. This moisture control acts on the position of the air conduction element and positions the air conduction element so that any abrupt drop in the moisture value is compensated, for example, by increasing the proportion of humid circulating air and reducing the proportion of relatively dry fresh air. In addition to avoiding misting of the windows, the moisture control also serves to increase the comfort of the vehicle occupants.

According to a refinement of the invention, a further moisture sensor is provided to detect the exterior moisture. The measured exterior moisture can then be taken into account in the control of the interior moisture by means of the air conduction element, so that the device according to the invention can respond rapidly to abrupt changes in the exterior moisture, for example when travelling through heavy rain.

According to another refinement of the invention, a control unit is provided. The control unit has a microprocessor and a memory in which a control program is stored. By means of the control program, control of the air conduction element as a function of the moisture and pollution can be implemented in a simple manner.

The fresh air and, if appropriate, also the circulating air are preferably conducted via a filter unit, so that dust particles and pollutants can be filtered out of the air. The circulating-air dryer and the filter unit preferably form an integral component, such as is known, for example, from DE 44 41 264.

If the circulating-air dryer and/or the filter unit can be bridged by at least one bypass duct, for example, where the air is not charged with pollutants or does not have a high moisture content, the air can be conducted through the bypass duct, so that a lower fan output is required for the air flow since there is no longer any pressure drop occurring due to the filter and/or the circulating-air dryer. The bypass duct can be closed by a bypass flap which is preferably controlled by the control unit. By virtue of the central control by the control unit, the moisture content of the air in the vehicle interior can be controlled, on the one hand, by the ratio of circulating air to fresh air and, on the other hand, by the fact that at least a partial air stream is conducted via the circulating-air dryer by means of the adjustable bypass flap. The pollution content of the air in the vehicle interior can be controlled in a similar manner.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
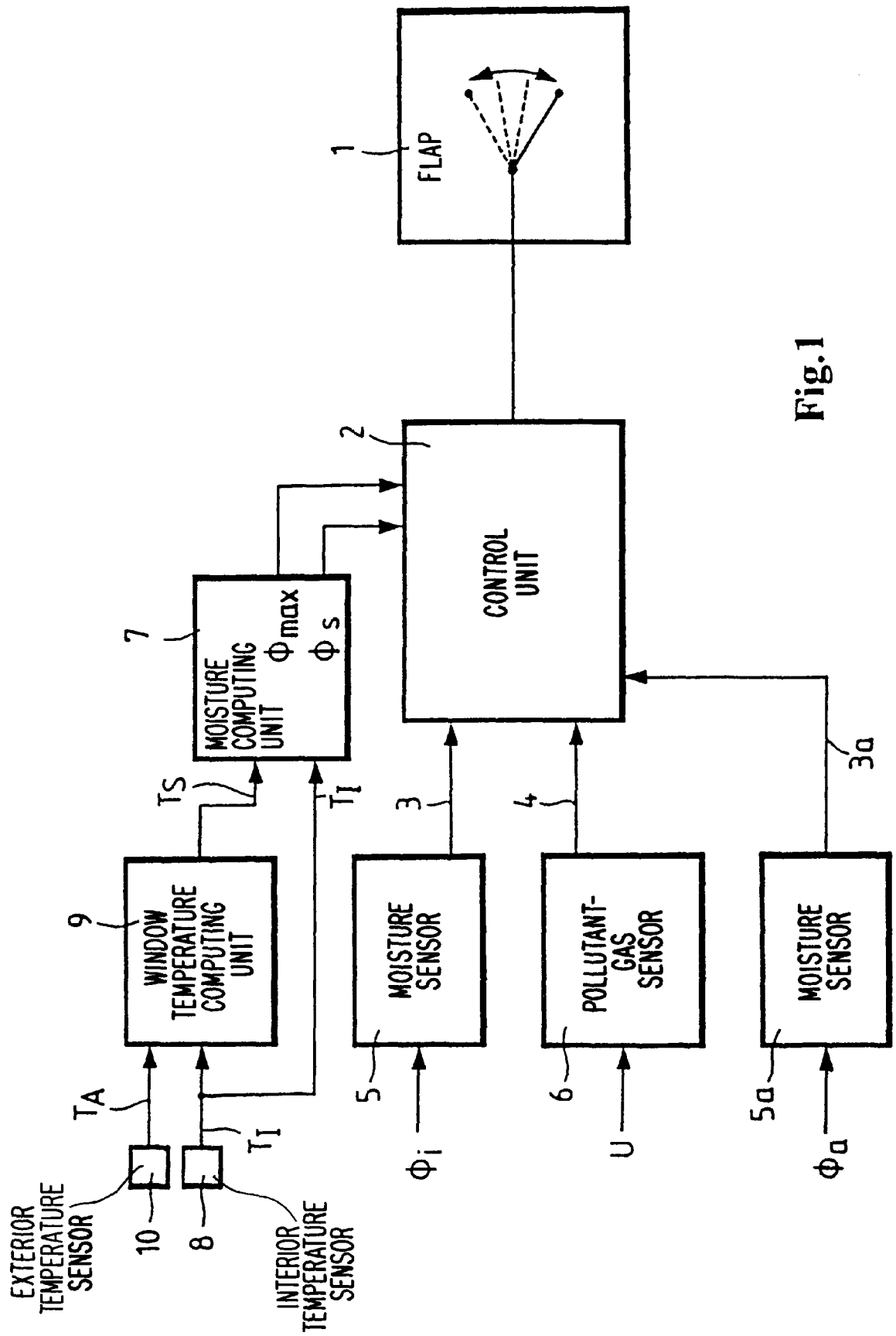
FIG. 1 is a block diagram of a control circuit for an air conduction system in accordance with the invention.

Referring now to the drawings, wherein like numerals indicate like parts, and initially to FIG. 1, there will be seen a block circuit diagram of the control circuit of an air conduction element, such as a circulating-air/fresh-air flap 1. The circulating-air/fresh-air flap 1 can be adjusted by an adjusting device (not shown), for example a stepping motor, in any desired position between a first end position, in which only circulating air is conducted into the vehicle interior, and a second end position in which only fresh air is conducted into the vehicle interior. The stepping motor receives a control signal from a control unit 2 to control the flap 1, so that any desired ratio of fresh air to circulating air can be supplied to the vehicle interior.

The control unit 2 is acted upon on the input side by a signal 3 from a moisture sensor 5 mounted inside the vehicle interior and a signal 4 from a pollutant gas sensor which signals are provided by a moisture sensor. The pollutant gas sensor 6 detects the concentration of pollution in the ambient air. Moreover, a further moisture sensor 5a mounted outside the vehicle may be provided to measure the exterior moisture $\Phi_a$, and its signal 3a is likewise fed to the control unit 2. Furthermore, the control unit 2 is connected on the input side to a moisture computing unit 7 in which a maximum interior moisture value $\Phi_{max}$ and a desired moisture value $\Phi_{soll}$ are calculated. The maximum moisture value $\Phi_{max}$ specifies the value up to which the moisture in the vehicle interior may rise at maximum circulating-air operation without there being any risk of the windows misting up. The desired value $\Phi_{soll}$ specifies the moisture value which is to be set by control or regulation when traveling through a low-pollution area by an appropriate position of the circulating-air/fresh-air flap 1, so that the vehicle occupants are comfortable. The moisture computing unit 7 is connected on the input side to an interior temperature sensor 8 which provides the interior temperature $T_I$ and to a window temperature computing unit 9. The window temperature computing unit 9 is connected on the input side to the interior temperature sensor 8 and to an exterior temperature sensor 10. The window temperature $T_S$ is calculated by the window temperature computing unit 9 according to the following equation:

$$T_S = \frac{5 \times T_A + 2 \times T_I}{7}$$

The window temperature $T_S$ calculated in this way is used, together with the interior temperature $T_I$, to calculate the maximum moisture $\Phi_{max}$. After converting the following equation, the maximum moisture value $\Phi_{max}$, which acts upon the control unit 2 as an output variable from the moisture computing unit 7, can be calculated.

$$ln_{\phi max} = \frac{K_1}{K_2 + T_I} - \frac{K_1}{K_2 + T_S} = X$$

The desired moisture value $\Phi_{soll}$ (=$\Phi_S$ in FIG. 1) is an empiric value and can be fixed by a constant factor below the maximum moisture $\Phi_{max}$ or, alternatively, it can vary as a function of the outside-air temperature $T_A$. The control unit 2, the moisture computing unit 7, and the window temperature computing unit 9 are preferably designed to be integral constituents of a microcontroller.

Figure 2:
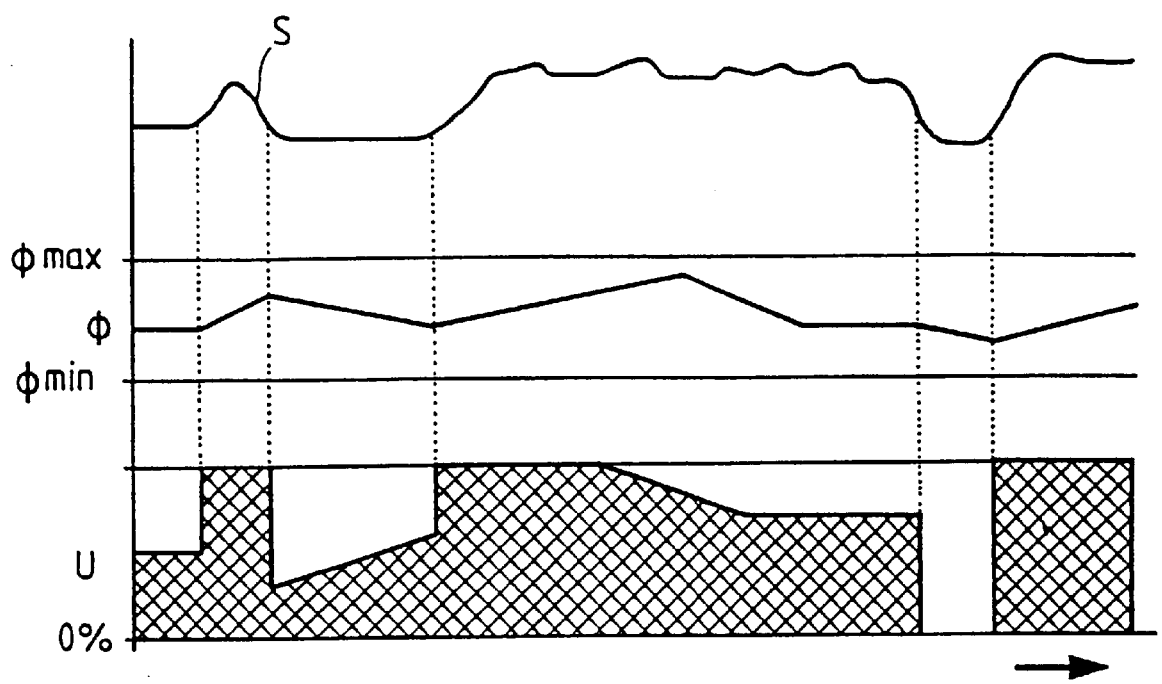
FIG. 2 is a diagram of the variation in time of a pollution concentration S, a moisture $\Phi$, and the position of the air conduction element U.

FIG. 2 shows the position of the circulating-air/fresh-air flap 1 as a function of the outside pollution concentration S. When the vehicle drives through a low-pollution area, the flap 1 is controlled in such a way that a constant desired moisture value $\Phi_{soll}$ is achieved in the vehicle interior. To achieve a mean moisture, the flap 1 assumes a central position (U in FIG. 2 indicating the position of the flap 1) in which the circulating air and the fresh air are supplied in equal proportions to the vehicle interior. If the pollution concentration in the ambient air increases sharply, the flap 1 is adjusted to circulating-air operation, the signal 3 from the moisture sensor rising steadily. If the pollution concentration in the ambient air drops below a prescribed threshold value, there is a switchover to fresh-air operation, specifically with a low proportion of circulating air so that the interior moisture can decrease continuously without severe fluctuations occurring. If the vehicle moves through an area of prolonged high pollution concentration, the flap 1 is held completely in circulating-air operation until the signal 3 from the moisture sensor has approximately reached the maximum moisture $\Phi_{max}$. In order to prevent misting of the windows, the proportion of circulating air is reduced continuously, specifically down to a value at which the interior moisture $\Phi_i$ has an essentially constant value. In this case, a relatively small proportion of fresh air is fed to the vehicle interior. A complete switchover of the flap 1 to fresh-air operation is avoided to a great extent by this automatic control. The flap 1 only has to be manually moved into the fresh-air end position under status conditions in which the air has a high degree of moisture and the vehicle is driving through an area of high pollution density for a prolonged period. Otherwise pure fresh-air operation only takes place in areas of relatively low pollution concentration in which the circulating-air/fresh-air flap 1 is moved into the fresh-air end position manually or to control the interior moisture $\Phi_i$.

In another embodiment of the invention, a circulating-air dryer 29 (FIG. 6) can be provided, whereby moisture is extracted from the circulating air. The circulating-air dryer 29 can be, for example, a continuously regenerating dryer, such as is known, for example, from DE 44 27 793. The circulating-air dryer is connected into the air path whenever the air has a high degree of moisture and the vehicle is traveling through an area of high pollution density for a prolonged period. This allows the vehicle to continue solely in circulating-air operation for a longer time without the moisture content of the air rising to such an extent that there is misting of the windows. If the moisture content of the air is low, the circulating-air dryer 29 can be bridged by means of a bypass duct 34 so that a pressure drop due to the circulating-air dryer 20 is avoided, and the fan output can be reduced.

Figure 3:
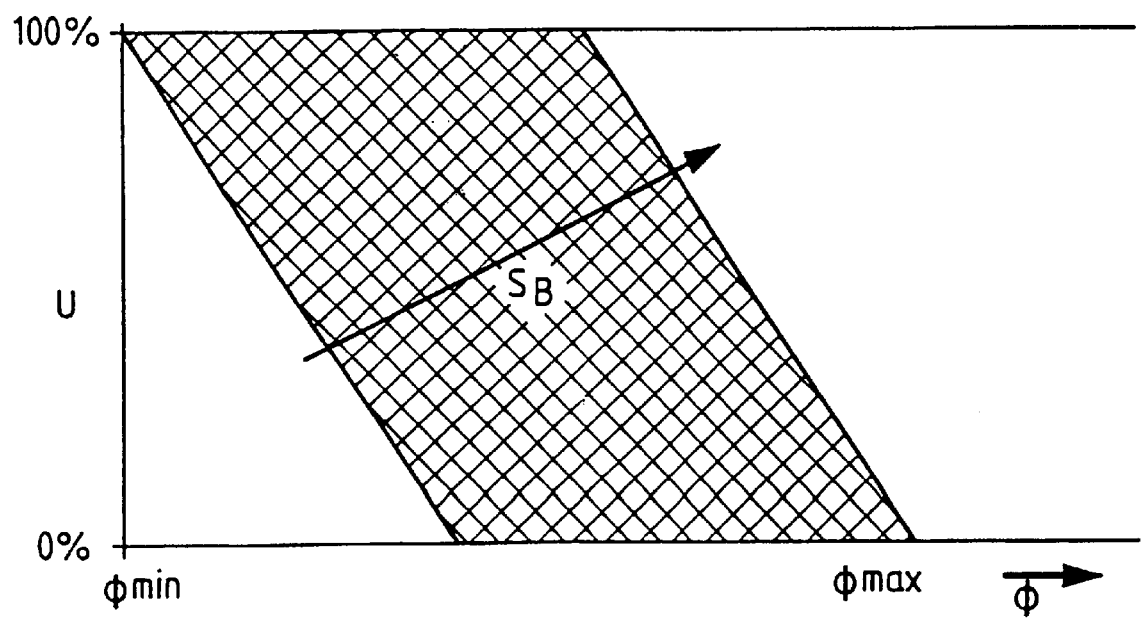
FIG. 3 is a diagram of the functional dependence of the position of the air conduction element U as a function of the moisture $\Phi$.

FIG. 3 shows a control characteristic in which the circulating-air position of the flap 1 is illustrated as a function of the interior moisture $\Phi_i$. The higher the interior moisture $\Phi_i$, the smaller the proportion of circulating air which is conducted into the vehicle interior based on the position of the flap 1. With an increasing pollution impact ($S_B$), however, a higher interior moisture value $\Phi_i$ has to be tolerated so that the vehicle occupants are protected to a great extent from the pollution impact of the surroundings.

Figure 4:
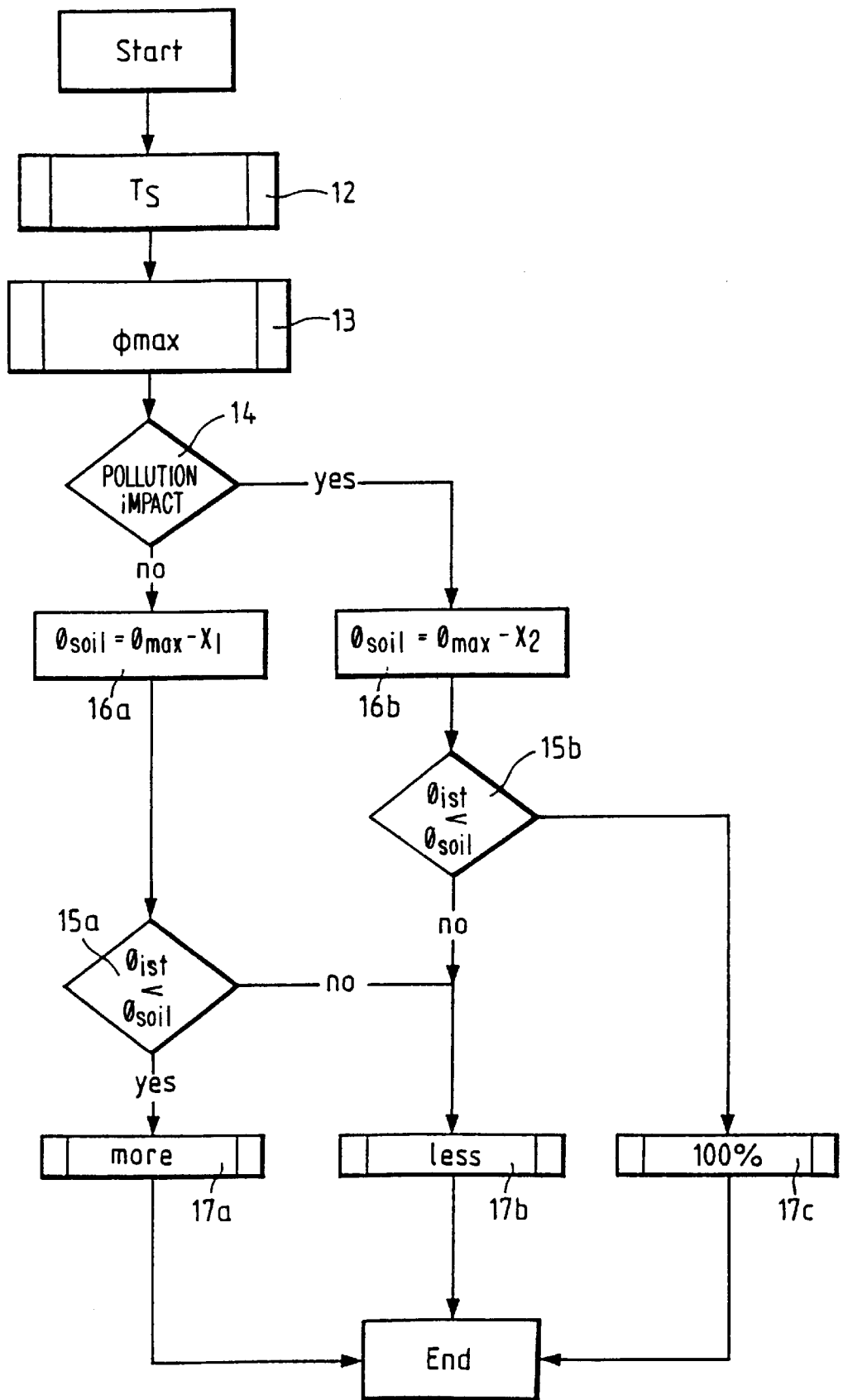
FIG. 4 is a program flow chart of a preferred embodiment of the invention.

FIG. 4 shows a flow chart of a program which is stored in a memory of the microcontroller and is processed by the control unit 2. Following the start of the program, the window temperature $T_S$ is calculated in step 12 in accordance with the calculation formula specified above. The maximum permissible moisture $\Phi_{max}$ is subsequently calculated in step 13. In step 14, the instantaneous signal 4 from the pollutant gas sensor is compared to a given pollutant threshold value. If the signal 4 from the pollutant gas sensor is higher than the threshold value, the desired moisture value $\Phi_{soll}$ is determined by subtracting a constant value X2 from the calculated maximum value $\Phi_{max}$ in step 16b. If the pollution impact is lower than the given threshold value, the desired value $\Phi_{soll}$ is determined by subtracting a constant value X1, which is higher than the constant value X2, from the calculated value $\Phi_{max}$ in step 16a.

Further on in the process, the current signal $\Phi_{ist}$ from the moisture sensor is compared to the desired moisture value $\Phi_{soll}$ in steps 15a and 15b. When there is pollution impact, for example where the actual moisture value $\Phi_{ist}$ is lower than the desired moisture value $\Phi_{soll}$, the operation is switched to 100% circulating air, as in step 17c. If, however, the current signal $\Phi_{ist}$ from the moisture sensor is higher than the desired moisture value $\Phi_{soll}$, the flap 1 is moved into a position in which a proportion of fresh air is also supplied to the vehicle interior, as in step 17b. If, when the program is run through again, it is established that the instantaneous moisture value $\Phi_{ist}$ is still higher than the desired moisture value $\Phi_{soll}$, the proportion of circulating air is reduced until the desired moisture value $\Phi_{soll}$ has been reached. Even when there is a slight pollution impact, i.e., the signal 4 from the pollutant gas sensor is lower than the pollutant threshold value, the proportion of circulating air is reduced if the instantaneous moisture value $\Phi_{ist}$ is not lower than the desired moisture value $\Phi_{ist}$. The proportion of circulating air is increased if the instantaneous moisture value $\Phi_{ist}$ is lower than the desired moisture value $\Phi_{soll}$, as in step 17a. After adjustment of the flap 1, the program is ended and is subsequently started again.

Figure 5:
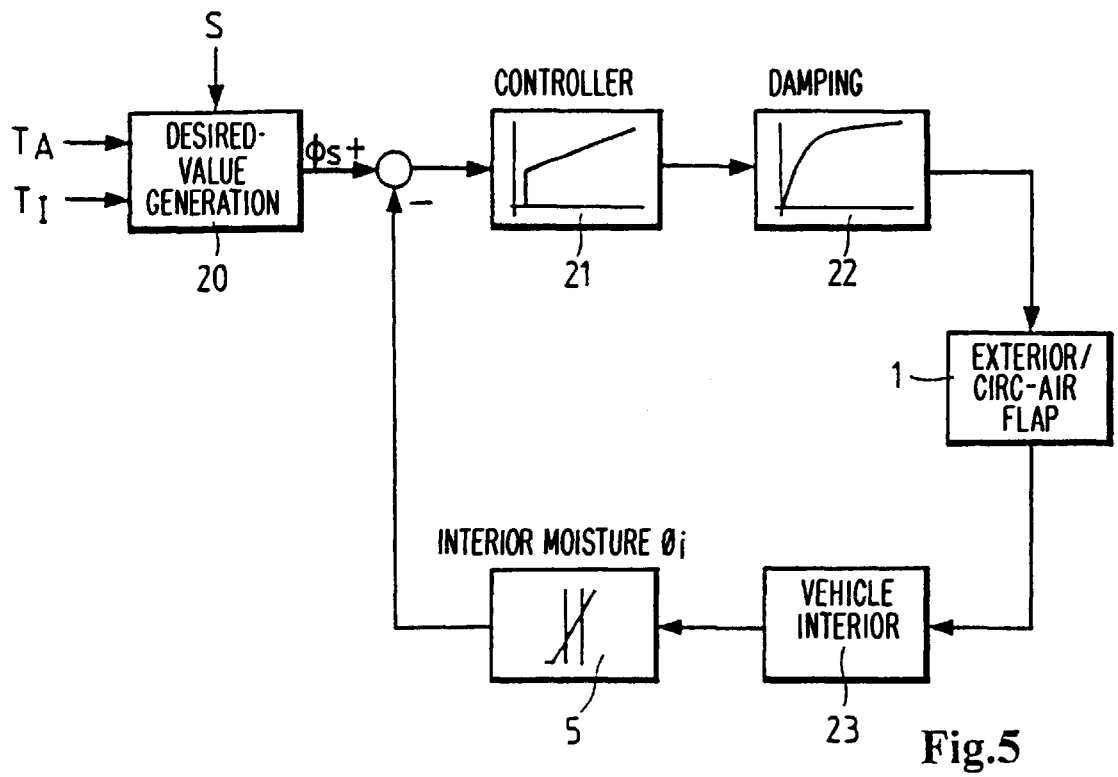
FIG. 5 is a block diagram of a control circuit for the interior moisture.

As an alternative, a block circuit diagram of a control circuit is illustrated in FIG. 5, which controls the interior moisture $\Phi_i$ of the vehicle to a given desired moisture value $\Phi_{soll}$ ($=\Phi_S$ in FIG. 5). In accordance with the equations described above, the desired-value generation 20 of the moisture can be carried out from the outside-air temperature $T_A$ and the interior temperature $T_I$. The higher the detected pollution impact, the higher the desired value of the moisture generated, so that the proportion of fresh air can be reduced to a minimum. The desired value $\Phi_{soll}$ generated in this way is compared to a signal which represents the instantaneous interior moisture $\Phi_i$. The control deviation is transmitted to the input of a controller, for example a PI controller 21. After subsequent damping in a damping actuator 22, the position of the circulating-air/fresh-air flap 1 is changed in such a way that the interior moisture $\Phi_i$ is adapted to the desired moisture $\Phi_{soll}$. Serving as a control system is the vehicle interior 23, in which the moisture sensor 5 is located.

Figure 6:
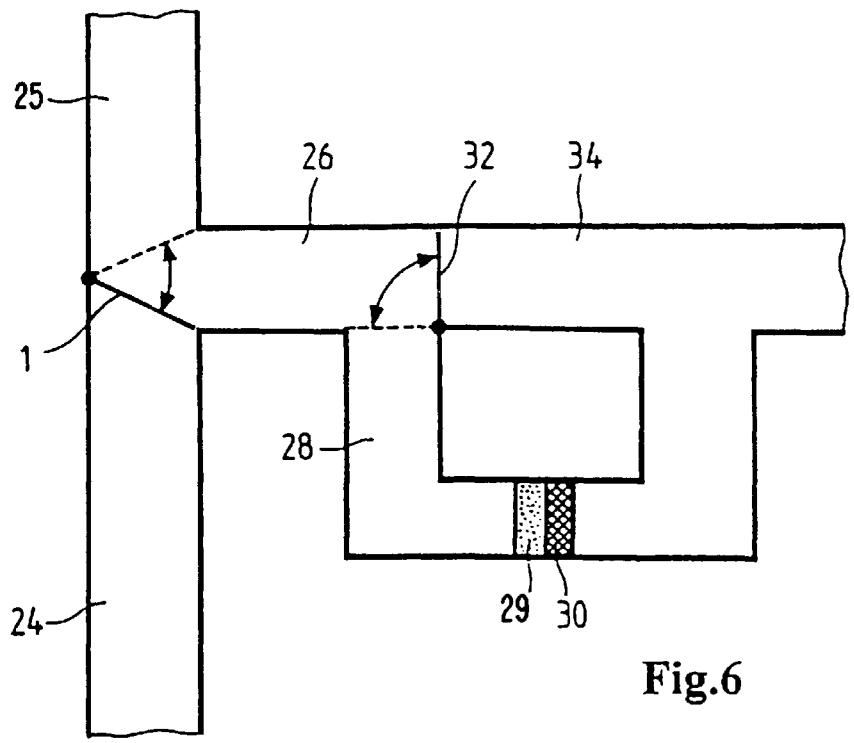
FIG. 6 is a schematic of a device for air conduction.

FIG. 6 illustrates part of a device for air conduction. The circulating-air/fresh-air flap 1 can be adjusted by the control unit 2 between the first setting (shown by dashes) and the second setting (shown by a solid line) in which only fresh air is conducted through the fresh-air duct 25 into the vehicle interior. The fresh-air and/or circulating air can be supplied to the vehicle interior via a duct 26. Adjoining the air duct 26 is a duct 28 which conducts the air via the circulating-air dryer 29 and preferably a filter 30 which can adsorb the dust particles and pollutants. The duct 28 can be closed by a bypass flap 32, which can be adjusted by the control unit 2. When the duct 28 is in a closed state (i.e., when the bypass flap 32 is in the position shown by dashes), the air is supplied directly to the vehicle interior via a bypass duct 34. In further embodiments of the invention (not shown), the circulating-air dryer 29 and the filter 30 may be provided in separate air conduction ducts which can each be bridged by a bypass duct. Each of these bypass ducts can be closed by a bypass flap actuated by the control unit 2.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The entire contents, including the text and drawings, of German patent application 196 37 232.1 filed Sep. 13, 1996, is hereby incorporated by reference.

What is claimed is:

1. A device for controlling air conduction in a vehicle via a heating or air conditioning unit, comprising:

a pollutant-gas sensor adapted to detect the concentration of pollution in outside air and to generate a signal representative of the concentration of pollution in the outside air;

an exterior temperature sensor adapted to detect the temperature of the outside air ($T_A$) and to generate a signal representative of the temperature of the outside air;

a moisture sensor adapted to detect the moisture in an interior of the vehicle and to generate a signal representative of the moisture of the vehicle interior;

a control unit electrically communicating with the pollutant-gas sensor, the exterior temperature sensor, and the moisture sensor, the control unit adapted to produce a control signal that depends on the signals generated by the exterior temperature sensor and the pollutant-gas sensor; and an air conduction element adapted to receive the control signal, the control unit electrically communicating with and adapted to adjust the air conduction element to operate in at least one of a circulating-air mode and a fresh air mode dependent on signals from the moisture sensor and the pollutant-gas sensor.

2. The device as claimed in claim 1, further comprising an interior temperature sensor adapted to detect the temperature of an interior of the vehicle ($T_I$) and to generate a signal representative of the temperature of the vehicle interior.

3. The device as claimed in claim 1, wherein the air conduction element can be moved into an intermediate position so that the moisture of the vehicle interior does not exceed a maximum moisture value ($\Phi_{max}$) calculated as a function of the signal from the pollutant-gas sensor.

4. The device as claimed in claim 1, further comprising a second moisture sensor electrically communicating with the control unit, the second moisture sensor adapted to detect the exterior moisture ($\Phi_s$) and to generate a signal representative of the exterior moisture.

5. The device as claimed in claim 1, further comprising a window temperature computing unit adapted to calculate the window temperature ($T_S$) and to generate a signal representative of the window temperature; and a moisture computing unit, electrically connected to the control unit, adapted to calculate the maximum moisture value ($\Phi_{max}$) and to generate a signal representative of the maximum moisture value.

6. The device as claimed in claim 5, wherein the control unit, the moisture computing unit, and the window temperature computing unit are integrated in a module that has a microprocessor.

7. The device as claimed in claim 1, further comprising a circulating-air dryer.

8. The device as claimed in claim 7, further comprising at least on bypass duct positioned to bridge the circulating-air dryer.

9. The device as claimed in claim 7, further comprising a filter unit adapted to conduct at least one of fresh air and circulating air.

10. The device as claimed in claim 9, wherein the circulating-air dryer and the filter unit form an integral component.

11. The device as claimed in claim 10, further comprising at least one bypass duct positioned to bridge the circulating-air dryer and the filter unit.

12. The device as claimed in claim 11, further comprising a bypass flap to close the at least one bypass duct.

13. The device as claimed in claim 12, wherein the control unit controls opening and closing of the bypass flap.

14. A method for controlling air conduction in a vehicle, comprising:

providing an air conduction element positionable to control the circulating air and fresh air to be supplied to an interior of the vehicle;

providing a plurality of sensors adapted to generate signals indicative of vehicle status conditions; and positioning the air conduction element in at least one of a circulating-air position, a fresh-air position, and a plurality of intermediate positions between the circulating-air position and the fresh-air position, depending on the signals generated by the sensors.

15. The method as claimed in claim 14, further comprising providing a first moisture sensor adapted to generate a signal representative of moisture inside the vehicle, a second moisture sensor adapted to generate a signal representative of moisture in the ambient air outside the vehicle, and a pollutant-gas sensor adapted to generate a signal representative of the concentration of pollution in the ambient air; and moving the air conduction element into a position which increases or reduces the proportion of circulating air as a function of the signals generated by the first moisture sensor, the second moisture-sensor, and the pollutant-gas sensor.

16. The method as claimed in claim 14, further comprising repositioning the air conduction element to change the proportion of circulating air so that an instantaneous moisture value ($\Phi_{ist}$) is approximated to a desired moisture value ($\Phi_{soll}$).

17. The method as claimed in claim 16, wherein the desired moisture value ($\Phi_{soll}$) increases with a rise in the concentration of pollution in the ambient air.

18. The method as claimed in claim 16, wherein the instantaneous moisture value ($\Phi_{soll}$) is controlled.

19. The method as claimed in claim 15, further comprising providing a filter unit; and filtering at least part of the fresh air in the filter unit as a function of the signal generated by the pollutant-gas sensor.

20. The method as claimed in claim 14, further comprising providing a circulating-air dryer to circulate air within the vehicle.

\* \* \* \* \*